US007801814B2

(12) United States Patent
Cataline et al.

(10) Patent No.: US 7,801,814 B2
(45) Date of Patent: *Sep. 21, 2010

(54) SYSTEM AND METHOD FOR SELECTABLE FUNDING OF ELECTRONIC TRANSACTIONS

(75) Inventors: Glen R. Cataline, Dublin, OH (US); William Smith Rielly, Redmond, WA (US); William Scott Wallace, Downingtown, PA (US); Mark Robert Sheehan, Middletown, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 11/517,268

(22) Filed: Sep. 8, 2006

(65) Prior Publication Data

US 2007/0005496 A1    Jan. 4, 2007

(51) Int. Cl.
*G06Q 40/00* (2006.01)
(52) U.S. Cl. .......................... 705/39; 705/40
(58) Field of Classification Search .................. 705/35, 705/39, 40, 1
See application file for complete search history.

(56) References Cited

U.S. PATENT DOCUMENTS

| 3,653,480 | A | 4/1972 | Yamamoto et al. |
| 3,938,090 | A | 2/1976 | Borison et al. |
| 4,050,375 | A | 9/1977 | Orleans |
| 4,141,078 | A | 2/1979 | Bridges et al. |
| 4,205,780 | A | 6/1980 | Burns |
| 4,264,808 | A | 4/1981 | Owens et al. |
| 4,321,672 | A | 3/1982 | Braun et al. |
| 4,385,285 | A | 5/1983 | Horst et al. |
| 4,396,985 | A | 8/1983 | Ohara |
| 4,443,027 | A | 4/1984 | McNeely et al. |
| 4,453,074 | A | 6/1984 | Weinstein |
| 4,454,414 | A | 6/1984 | Benton |
| RE31,692 | E | 10/1984 | Tyburski et al. |
| 4,495,018 | A | 1/1985 | Vohrer |
| 4,575,621 | A | 3/1986 | Dreifus |
| 4,605,844 | A | 8/1986 | Haggan |

(Continued)

FOREIGN PATENT DOCUMENTS

EP          0099999          7/1983

(Continued)

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.

(Continued)

*Primary Examiner*—Stefanos Karmis
(74) *Attorney, Agent, or Firm*—Hunton & Williams LLP

(57) ABSTRACT

A system for transferring funds to pay bills and to and from selected accounts on an optimized is provided. A mediation engine may manage the payments made to selected payees, including by scheduling the payments and selecting sources for funds. A rules-based optimizer may automatically select the least-cost or other most efficient or desirable transaction, given the customer's available funds, types of funds and payment date. All payment providers and payees may manipulated using one seamless view. A customer service representative may also view the transfers.

17 Claims, 4 Drawing Sheets

U.S. PATENT DOCUMENTS

| | | |
|---|---|---|
| 4,617,457 A | 10/1986 | Myers et al. |
| 4,650,981 A | 3/1987 | Foletta |
| 4,669,730 A | 6/1987 | Small |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian, Jr. |
| 4,701,601 A | 10/1987 | Francini et al. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,817,949 A | 4/1989 | Bachman et al. |
| 4,823,264 A | 4/1989 | Deming |
| 4,845,347 A | 7/1989 | McCrindle |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,007,084 A | 4/1991 | Materna et al. |
| 5,023,904 A | 6/1991 | Kaplan |
| 5,025,139 A | 6/1991 | Halliburton, Jr. |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,224,034 A | 6/1993 | Katz et al. |
| 5,225,978 A | 7/1993 | Peterson |
| 5,237,159 A | 8/1993 | Stephens |
| 5,257,486 A | 11/1993 | Holmwall |
| 5,265,007 A | 11/1993 | Barnhard, Jr. et al. |
| 5,283,829 A | 2/1994 | Anderson |
| 5,287,269 A | 2/1994 | Dorrough et al. |
| 5,305,196 A | 4/1994 | Deaton et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,327,508 A | 7/1994 | Deaton et al. |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | VanHorn et al. |
| 5,373,550 A | 12/1994 | Campbell |
| 5,382,784 A | 1/1995 | Eberhardt |
| 5,396,417 A | 3/1995 | Burks |
| 5,402,474 A | 3/1995 | Miller |
| 5,412,190 A | 5/1995 | Kopesec et al. |
| 5,413,341 A | 5/1995 | Lieberman |
| 5,424,938 A | 6/1995 | Wagner |
| 5,428,684 A | 6/1995 | Akiyama et al. |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,640,577 A | 6/1997 | Scharmer |
| 5,642,419 A | 6/1997 | Rosen |
| 5,644,778 A | 7/1997 | Burks et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles et al. |
| 5,757,917 A | 5/1998 | Rose et al. |

| Patent No. | Date | Name |
|---|---|---|
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,928,082 A | 7/1999 | Clapper, Jr. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,950,174 A * | 9/1999 | Brendzel .................... 705/34 |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,970,469 A | 10/1999 | Scroggie et al. |
| 5,970,475 A | 10/1999 | Barnes et al. |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,749 A | 11/1999 | Morrill, Jr. |
| 5,991,750 A | 11/1999 | Watson |
| 6,000,832 A | 12/1999 | Franklin et al. |
| 6,002,767 A | 12/1999 | Kramer |
| 6,003,762 A | 12/1999 | Hayashida |
| 6,006,208 A | 12/1999 | Forst et al. |
| 6,009,442 A | 12/1999 | Chen et al. |
| 6,014,634 A | 1/2000 | Scroggie et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,048,271 A | 4/2000 | Barcelou |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmermann et al. |
| 6,098,053 A | 8/2000 | Slater |
| 6,098,070 A | 8/2000 | Maxwell |
| 6,101,479 A | 8/2000 | Shaw |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,182,059 B1 | 1/2001 | Angotti et al. |
| 6,185,541 B1 | 2/2001 | Scroggie et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,243,689 B1 | 6/2001 | Norton |
| 6,278,981 B1 | 8/2001 | Dembo et al. |
| 6,278,996 B1 | 8/2001 | Richardson et al. |
| 6,282,516 B1 | 8/2001 | Giullani |
| 6,289,322 B1 | 9/2001 | Kitchen et al. |

| | | | | | | |
|---|---|---|---|---|---|---|
| 6,292,789 B1 | 9/2001 | Schutzer | | 6,965,882 B1 | 11/2005 | Lapstun et al. |
| 6,301,379 B1 | 10/2001 | Thompson et al. | | 6,970,259 B1 | 11/2005 | Lunt et al. |
| 6,301,567 B1 | 10/2001 | Leong et al. | | 6,970,830 B1 | 11/2005 | Samra et al. |
| 6,304,858 B1 | 10/2001 | Mosler et al. | | 6,970,855 B2 | 11/2005 | Das et al. |
| 6,305,603 B1 | 10/2001 | Grunbok, Jr. et al. | | RE38,957 E | 1/2006 | Laussermair et al. |
| 6,321,212 B1 | 11/2001 | Lange | | 6,999,938 B1 | 2/2006 | Libman |
| 6,327,575 B1 | 12/2001 | Katz | | 6,999,943 B1 * | 2/2006 | Johnson et al. ............... 705/39 |
| 6,338,047 B1 | 1/2002 | Wallman | | 7,004,382 B2 | 2/2006 | Sandru |
| 6,338,049 B1 | 1/2002 | Walker et al. | | 7,014,110 B2 | 3/2006 | Minowa et al. |
| 6,343,279 B1 | 1/2002 | Bissonette et al. | | 7,024,374 B1 | 4/2006 | Day et al. |
| 6,344,108 B1 | 2/2002 | Von Medvey et al. | | 7,025,256 B1 | 4/2006 | Drummond et al. |
| 6,349,972 B1 | 2/2002 | Geiger et al. | | 7,039,600 B1 | 5/2006 | Meek et al. |
| 6,351,735 B1 | 2/2002 | Deaton et al. | | 7,062,456 B1 | 6/2006 | Riehl et al. |
| 6,363,164 B1 | 3/2002 | Jones et al. | | 7,068,832 B1 | 6/2006 | Price et al. |
| 6,363,364 B1 | 3/2002 | Nel | | 7,070,095 B1 | 7/2006 | Gandel et al. |
| 6,363,365 B1 | 3/2002 | Kou | | 7,103,556 B2 | 9/2006 | Del Ray et al. |
| 6,366,967 B1 | 4/2002 | Wagner | | 7,104,443 B1 | 9/2006 | Paul et al. |
| 6,374,235 B1 | 4/2002 | Chen et al. | | 7,133,846 B1 | 11/2006 | Ginter et al. |
| 6,377,935 B1 | 4/2002 | Deaton et al. | | 7,159,116 B2 | 1/2007 | Moskowitz |
| 6,390,362 B1 | 5/2002 | Martin | | 7,177,836 B1 | 2/2007 | German et al. |
| 6,393,409 B2 | 5/2002 | Young et al. | | 7,194,437 B1 | 3/2007 | Britto et al. |
| 6,405,173 B1 | 6/2002 | Honarvar et al. | | 7,200,255 B2 | 4/2007 | Jones et al. |
| 6,409,593 B1 | 6/2002 | Petrecca | | 7,228,155 B2 | 6/2007 | Saunders |
| 6,411,947 B1 | 6/2002 | Rice et al. | | 7,246,263 B2 | 7/2007 | Skingle |
| 6,415,259 B1 | 7/2002 | Wolfinger et al. | | 7,246,324 B2 | 7/2007 | Mikhail et al. |
| 6,418,419 B1 | 7/2002 | Nieboer et al. | | 7,249,095 B2 | 7/2007 | Davies et al. |
| 6,418,420 B1 | 7/2002 | DiGiorgio et al. | | 7,249,112 B2 | 7/2007 | Berardi et al. |
| 6,418,430 B1 | 7/2002 | DeFazio et al. | | 7,266,511 B2 | 9/2007 | Teshima |
| 6,434,159 B1 | 8/2002 | Woodward et al. | | 7,266,839 B2 | 9/2007 | Bowers et al. |
| 6,446,072 B1 | 9/2002 | Schulze et al. | | 7,277,870 B2 | 10/2007 | Mourad et al. |
| 6,454,647 B1 | 9/2002 | Woodbury, Jr. | | 7,287,009 B1 | 10/2007 | Liebermann |
| 6,456,981 B1 | 9/2002 | Dejaeger et al. | | 7,312,707 B1 | 12/2007 | Bishop et al. |
| 6,460,020 B1 | 10/2002 | Pool et al. | | 7,313,543 B1 | 12/2007 | Crane et al. |
| 6,485,922 B1 | 11/2002 | Erickson et al. | | 7,317,823 B1 | 1/2008 | Price et al. |
| 6,490,568 B1 | 12/2002 | Omara et al. | | 7,337,148 B2 | 2/2008 | Xie et al. |
| 6,493,685 B1 | 12/2002 | Ensel et al. | | 7,349,884 B1 | 3/2008 | Odom |
| 6,535,896 B2 | 3/2003 | Britton et al. | | RE40,220 E | 4/2008 | Nichols et al. |
| 6,536,663 B1 | 3/2003 | Lozier et al. | | 7,380,707 B1 | 6/2008 | Fredman |
| 6,554,185 B1 | 4/2003 | Montross et al. | | 7,401,048 B2 | 7/2008 | Rosedale et al. |
| 6,560,581 B1 | 5/2003 | Fox et al. | | 7,426,530 B1 | 9/2008 | Rosko et al. |
| 6,574,350 B1 | 6/2003 | Rhoads et al. | | 7,493,288 B2 | 2/2009 | Biship et al. |
| 6,574,377 B1 | 6/2003 | Cahill et al. | | 7,536,354 B1 | 5/2009 | Degroeve et al. |
| 6,578,000 B1 | 6/2003 | Dodrill et al. | | 7,542,921 B1 | 6/2009 | Hildreth |
| 6,578,015 B1 | 6/2003 | Haseltine et al. | | 7,546,272 B2 | 6/2009 | Loy |
| 6,607,127 B2 | 8/2003 | Wong | | 7,587,363 B2 | 9/2009 | Cataline et al. |
| 6,609,113 B1 | 8/2003 | O'Leary et al. | | 2001/0011222 A1 | 8/2001 | McLauchlin et al. |
| 6,609,125 B1 | 8/2003 | Layne et al. | | 2001/0018666 A1 | 8/2001 | Sugiyama et al. |
| 6,615,190 B1 * | 9/2003 | Slater ......................... 705/41 | | 2001/0018739 A1 | 8/2001 | Anderson et al. |
| 6,629,081 B1 | 9/2003 | Cornelius et al. | | 2001/0023415 A1 | 9/2001 | Keil |
| 6,636,615 B1 | 10/2003 | Rhoads et al. | | 2001/0032139 A1 | 10/2001 | Debonnet, Jr. |
| 6,658,393 B1 | 12/2003 | Basch et al. | | 2001/0034663 A1 | 10/2001 | Teveler et al. |
| 6,661,910 B2 | 12/2003 | Jones et al. | | 2001/0037300 A1 | 11/2001 | Miyazaki et al. |
| 6,704,714 B1 | 3/2004 | O'Leary et al. | | 2001/0037309 A1 | 11/2001 | Vrain |
| 6,721,715 B2 | 4/2004 | Nemzow | | 2001/0038033 A1 | 11/2001 | Habib |
| 6,728,397 B2 | 4/2004 | McNeal | | 2001/0047334 A1 | 11/2001 | Nappe et al. |
| D490,840 S | 6/2004 | Arakaki et al. | | 2001/0047489 A1 | 11/2001 | Ito et al. |
| D491,186 S | 6/2004 | Arakaki et al. | | 2001/0051533 A1 | 12/2001 | Wietzke et al. |
| D491,953 S | 6/2004 | Arakaki et al. | | 2002/0012445 A1 | 1/2002 | Perry |
| D496,365 S | 9/2004 | Liu et al. | | 2002/0013728 A1 | 1/2002 | Wilkman |
| D498,236 S | 11/2004 | Liu et al. | | 2002/0023055 A1 | 2/2002 | Antognini et al. |
| 6,820,058 B2 | 11/2004 | Wood et al. | | 2002/0026394 A1 | 2/2002 | Savage et al. |
| 6,824,066 B2 | 11/2004 | Weyant | | 2002/0032651 A1 | 3/2002 | Embrey |
| 6,825,940 B1 | 11/2004 | Wu et al. | | 2002/0038363 A1 | 3/2002 | MacLean |
| 6,856,973 B1 | 2/2005 | Bott | | 2002/0046169 A1 | 4/2002 | Keresman, III et al. |
| 6,860,375 B2 | 3/2005 | Hallowell et al. | | 2002/0047316 A1 | 4/2002 | Chitayat |
| 6,885,994 B1 | 4/2005 | Scroggie et al. | | 2002/0052842 A1 | 5/2002 | Schuba et al. |
| 6,886,046 B2 | 4/2005 | Stutz et al. | | 2002/0055907 A1 | 5/2002 | Pater et al. |
| 6,892,187 B2 | 5/2005 | Phillips et al. | | 2002/0062282 A1 | 5/2002 | Kight et al. |
| 6,912,502 B1 | 6/2005 | Buddle et al. | | 2002/0069134 A1 | 6/2002 | Solomon |
| 6,942,569 B2 | 9/2005 | Petrecca | | 2002/0072976 A1 | 6/2002 | Virtanen et al. |
| 6,945,453 B1 | 9/2005 | Schwarz, Jr. | | 2002/0077978 A1 | 6/2002 | O'Leary et al. |
| 6,954,896 B1 | 10/2005 | Dodrill et al. | | 2002/0082985 A1 | 6/2002 | MacKay |
| 6,961,710 B1 | 11/2005 | Yanagisawa et al. | | 2002/0084321 A1 | 7/2002 | Martens et al. |

| | | |
|---|---|---|
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0099586 A1 | 7/2002 | Bladen et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0129221 A1 | 9/2002 | Borgin et al. |
| 2002/0133461 A1 | 9/2002 | Ramachandran |
| 2002/0138398 A1 | 9/2002 | Kalin et al. |
| 2002/0145039 A1 | 10/2002 | Carroll |
| 2002/0156723 A1* | 10/2002 | Lilly et al. .................... 705/38 |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0010116 A1 | 1/2003 | Cavazzin et al. |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040927 A1 | 2/2003 | Sato et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0065805 A1 | 4/2003 | Barnes, Jr. |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130919 A1 | 7/2003 | Templeton et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0213843 A1 | 11/2003 | Jackson |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0220989 A1 | 11/2003 | Tsuji et al. |
| 2003/0225663 A1 | 12/2003 | Horan et al. |
| 2003/0229525 A1 | 12/2003 | Callahan et al. |
| 2003/0233305 A1 | 12/2003 | Solomon |
| 2003/0236747 A1 | 12/2003 | Sager |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0039691 A1 | 2/2004 | Barratt et al. |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0114883 A1 | 5/2005 | Nagai et al. |
| 2005/0116024 A1 | 6/2005 | Beenau et al. |
| 2005/0144059 A1 | 6/2005 | Schuessler |
| 2005/0167488 A1 | 8/2005 | Higgins et al. |
| 2005/0177480 A1 | 8/2005 | Huang |
| 2005/0179251 A1 | 8/2005 | Wagoner et al. |
| 2005/0189427 A1 | 9/2005 | Brown et al. |
| 2005/0209954 A1 | 9/2005 | Asher et al. |
| 2005/0216888 A1 | 9/2005 | Drummond et al. |
| 2005/0228751 A1 | 10/2005 | Keown et al. |
| 2005/0261955 A1 | 11/2005 | Humble et al. |
| 2005/0289051 A1 | 12/2005 | Allin et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0095358 A1 | 5/2006 | Viarengo et al. |
| 2006/0106650 A1 | 5/2006 | Bush |
| 2006/0106703 A1 | 5/2006 | Del Rey et al. |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0192618 A1 | 8/2007 | Ellmore |
| 2007/0260706 A1 | 11/2007 | Skingle |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0016180 A1 | 1/2008 | Bowers et al. |
| 2008/0116283 A1 | 5/2008 | Newbrough et al. |
| 2008/0177659 A1 | 7/2008 | Lacey et al. |
| 2008/0193008 A1 | 8/2008 | Mount et al. |
| 2009/0043651 A1 | 2/2009 | Schwarz |

FOREIGN PATENT DOCUMENTS

| | | |
|---|---|---|
| EP | 0421808 | 4/1991 |
| EP | 421808 | 4/1991 |
| EP | 0665486 | 8/1995 |
| EP | 1014318 | 6/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying By Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money. Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 10561528, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, And Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

Unknown, ABA Banking Journal; The front end and back end functions of item processing will benefit from the technological advances of imaging; Mar. 1990; acs01038997.

Arend, Mark; Bank applications fuel optical storage market; ABA Banking Journal; Oct. 1991; acs01039000.

Unknown, Alabama department of revenue selects Unisys for imaging solution to speed tax returns, save taxpayers money; Sep. 6, 1995; acs01039064.

Hunt, Robert M., An Introduction to the Economics of Payment Card Networks; Jun. 2003.

Unknown, BancTec selects alchemy CD-Based archival solution for remittance processing system; May 6, 1998; acs01039047.

Keeton, Ann, Bank of America completes its rollout of 'paperless' processing of payments; Nov. 1, 1999; acs01039334.

Stanley, Susan et al., Bank of America provides nationwide image lockbox services; Oct. 20, 1999; acs01039405.

Business Wire; 1A Corp. wins contract with comerica to install the first digital all items archive, one of nation's top 25 bank holding companies expects to streamline operations . . . ; Jan. 9, 1997; acs01039033.

Business Wire; IA Corp. shows complex transaction processing software Work vision at AIIM, plus Check Vision and Remit Vision application frameworks for new advanced banking services . . . ; Apr. 14, 1997; acs01039025.

Business Wire; Shawnut bank provides lockbox customers real-time, on-line electronic exception processing, 1A Corp's image-based lockbox system cuts processing time from days to minutes . . . ; Jan. 9, 1996; acs01039031.

Unknown, Business Wire; State of Minnesota using AT&T imaging solution . . . ; Apr. 18, 1994; acs01039027.

Unknown, Caere introduces the Model 1800 document remittance processor; compact unit provides cost effective means for low to medium speed document processing; Oct. 19, 1995; acs01039057.

Malyykhina, Elena, Cell Phone Software Formats Checks For Online Banking; InformationWeek; Jan. 24, 2008.

Lupo, Lisa Selkin, Chase image-enables NY wholesale lockbox facility with VICOR technology; Aug. 31, 1999; acs01039406.

Anonymous, Chase offers image lockbox for Europe; Aug. 1997; acs01039336.

Unknown, Crestar to introduce new advanced cash management system based on IA Corp. software; New system will be industry's first, . . . ; Oct. 28, 1996; acs01039059.

Unknown, DMP and IMR Partner to develop electronic archiving solution for wholesale Lockboxes and remittance processing; Mar. 24, 1998; acs01039040.

Matyas, Stephen M., Digital Signatures—An Overview; pp. 87-94; 1979.

Friis, M. William; Goodbye to paper?; ABA Banking Journal, Mar. 1989; acs01037874.

Unknown, IA Corp. announces new CheckVision products; new CheckVision archive software supports short; Apr. 1, 1996; acs01039339.

Unknown, IA Corporation becomes a major player in image-based cash management solutions; Nov. 24, 1995; acs01039052.

Unknown, IA announces installation at QuestPoint of first client/server cash management system with check image storage compatible with IBM, NCR and Unisys; May 29, 1997; acs01039044.

Unknown, IA presents new advanced cash management software at TMA to link banks and their corporate customers; full suite of cash management products allow banks to offer treasury . . . ; Nov. 18, 1996; acs01039049.

Unknown, IA's remit vision adopted by Harris Bank for CD-ROM and online customer viewing of check and remittance documents; continues banking industry trends to use image-based processing as strategic weapon . . . ; May 28, 1996; acs01039042.

IEM Product Description; date unknown, ACS01066106.

Fitch, Thomas P., Image technology brings lockbox breakthroughs; Sep. 1995; acs01039344.

Andersen Consulting, Image-based transaction processing; The banking industry's challenge for the 1990s and beyond; 1989; acs01039270.

Tauhert, Christy, Lock box solutions reengineer payments; Aug. 1996; acs01039337.

Mead, Wendy S.; Two Banks' Imaging Deals Target Fee Revenue Increases; The American Banker; May 9, 1997; acs01039019.

Moyer, Liz; Bank of Montreal to Install Imaging System by Unisys for Retail Lockbox Services; The American Banker; Oct. 22, 1996; acs01039023.

Moyer, Liz; KeyCorp joins trend to check imaging for lockbox; The American Banker; Aug. 23, 1996; acs01039004.

Unknown, NCR introduces 7780 item processing system; image-based system scans and reads documents; Mar. 11, 1992; acs01039038.

Marjanovic, Steven, NationsBank offers lockbox imaging; Jul. 3, 1995; acs01039350.

Unknown, NationsBank rolls out first wholesale lockbox imaging; Aug. 3, 1995; acs01039351.

Shannon, John, New lockbox platform due out at NationsBank; Feb. 1998; acs01039384.

Armstrong, Douglas, Norwest eases difficulty of Interstate banking Bank's customers may use the same account number at any branch; Oct. 12, 1995.

Price et al., U.S. Provisional Patent Application entitled Doculink Imaging System, submitted May 11, 1999.

Maturi, Richard, Personal Finance; When you Need to Send Cash in a Flash; Sep. 25, 1988.

Buckley, JP et. al., Processing Noisy Structured Textual Data Using a Fuzzy Matching Approach Application to Postal Address Errors; XP-001132075; pp. 195-205 (11 pages); Dec. 2000.

Schutzer, Daniel; Get ready for electronic commerce; ABA Banking Journal; Jun. 1995; acs01038994.

Jensen, Cindy, U.S. Bank effectively manages complexity; May/Jun. 2006; acs01039402.

Jensen, Cindy, U.S. bank effectively manages complexity; acs01039398, May/Jun. 2006.

Jensen, Cindy, U.S. bank effectively manages complexity; acs01039400; May/Jun. 2006.

Terrie Miller and Henry Yan, When Custody Governs, Benefits Canada, Toronto, Feb. 1998, vol. 22, Issue 2, p. 33, 5 pages.

Unknown, Wholesale lockbox imaging; Feb. 1, 1993; acs01039331.

Anonymous, Chasing the global trend, Cash Management News, ProQuest document ID 9319923, ISSN/ISBN: 02686635, Dec. 1995.

* cited by examiner

FIGURE 3

Drop down box

| Immediate Transfer |
| Overnight Transfer |
| Scheduled Payment |
| Recurring Payment |
| ... |

— 302

BANK ≡ ONE.

Bank One Online?

→ Privacy Policy   ? Help   ») Contact Us   → Logout

‹ Account Summary

Transfer Funds

? Page Help

| ▦ Checking1 | | | Select Action ▼ |
| XXXXX5611 | Current Balance | $0.00 | |
| | Available Balance | $0.00 | |
| | Last Statement Date | 04/19/2001 | |
| | Balance Last Statement | $0.00 | |
| | Interest YTD | $0.00 | |
| | Interest Rate | 0.00% | |

The information requested below is required to initiate a transfer of funds between accounts. You available balance immediately effects the transfer.

Use Best Payment for ▼   — 310

Last Delivery Time Security

Note:
- Transfers from Savings accounts are limited by the Federal Reserve. Learn more about these restrictions.
- Transfers to credit cards may not appear in your history for two business days, but will be credited as of today's date. Your available balance immediately reflects the transfer.
- If the transfer is made before 5 PM Eastern time, the transfer will be posted to your account activity at the end of the current business day.
- If a transfer is made after 5 PM Eastern time, it will be posted at the end of the next business day.

Transfer From : Checking1  $0.00 ▼

— 304

Transfer To :  ▮Checking to Sav▮ ▼

Amount (xxx.xx)  $ _____   [Transfer Funds] [Cancel]

Payment date  _____ — 306

308

Drop down box

| Bank One savings |
| Schwab MoneyMarket |
| First USA VISA |
| American Express |
| ... |

This list includes all accounts the user establishes in the set up process and could include nicknamed accounts.

Drop down box

| Bank One savings |
| E*Trade Brokerage |
| Spouse's savings |
| Other |
| ... |

This list could include accounts held by other people such as family members.

SYSTEM AND METHOD FOR SELECTABLE FUNDING OF ELECTRONIC TRANSACTIONS

CROSS-REFERENCE TO RELATED APPLICATIONS

The subject matter of this application is related to the subject matter of provisional application U.S. Ser. No. 60/245,665 filed Nov. 6, 2000, assigned or under obligation of assignment to the same entity as this application, from which application priority is claimed, and which application is incorporated by reference.

FIELD OF THE INVENTION

The invention relates generally to electronic commerce, and more particularly to a system and method for selectively scheduling payment and other transactions such as bill pay from a variety of sources and according to selectable schedules, while optimizing those transactions for least cost and other benefits to the payment enabler, consumer or others.

BACKGROUND OF THE INVENTION

Electronic commerce, such as personal banking via the Internet, has become increasingly popular. Many electronic banking applications enable a user to perform banking related transactions from home, such as through a personal computer, browser-equipped cellular phone, electronic wallet (both client side and server side) or other client device. Using the client device, a user may manipulate a graphical user interface to transfer funds between accounts, direct a wire payment to a third party, redeem securities or perform other transaction functions.

Electronic banking may however suffer from the drawback that it is difficult for a user to manipulate and move funds when and how the person desires. Some systems require a user to access multiple graphic user interface screens to effectuate the transfer of money, even from just one source account to just one recipient. These access requirements, possibly including repeated logins, may lengthen the process and cause user confusion, thereby discouraging a user from accessing the service.

Electronic banking may also suffer the drawback of defaulting to a payment mechanism which may not be the most efficient or cost effective manner for achieving various transactions. For example, some methods for transferring funds may be more expensive than others. A balance transfer transaction using a credit card account as a source of payment which is executed at a cost of, for example, 3% of balance may be more expensive than an ACH transfer, or transmitting a personal or certified check or postal or bank money order to satisfy the same credit card or other bill.

The host financial institution, acting as the payment enabler to the transaction, may therefore absorb different internal costs depending on the payment mechanism chosen by the user, or to which the transaction defaults. The consumer may in cases see those differing transaction costs reflected in different fees charged to them.

Moreover some financial institutions, from the point of view of internal operations, consider certain categories of funds transfer, including the Automated Clearing House (ACH) and wire transfer, as risky since authenticating the identity of the customer may be difficult or impossible. However security criteria may not always be factored into transaction defaults or rules. Other parameters, such as contractual obligations such as minimums with different payment providers, possible volume discounts, tiered rewards thresholds and others may not be taken into account in the ordinary routing of transactions.

The consumer, business or other payment initiator for their part may need to be aware of various payment mechanisms and the costs associated with each method of delivering payment to determine the most cost-effective way of transmitting funds, without assistance from the electronic payment system itself.

Fulfillment services may therefore be more expensive for providers and users than necessary, and less expedient or secure than they could be.

Further, many financial institutions such as banks, credit card companies, mortgage companies, securities houses and other entities contract with a single third party bill payment provider to have bills presented and paid on their behalf using bill pay platforms. Typically the Web site or telephone bill pay products are branded by the provider to represent the financial institution. In some cases the financial institution maintains the user interface but in other cases, the bill payment provider provides the user interface. Examples of bill payment providers include CheckFree, Spectrum, ePrinceton Telecom, M&I and others.

In addition, in most cases only one bill payment provider can be used at one time or by one customer due to a financial institution's inability to provide a consolidated view of the various bill payment and transfer methods. Usage of multiple bill payment services and transfers may cause further confusion for the customer, and the institution's customer care team.

An integrated, programmable and optimizing technique for managing various fund transfers and other transaction, and providing tracking to the customer and customer service representative, is not available. Other drawbacks exist.

SUMMARY OF THE INVENTION

The invention overcoming these and other problems in the art relates in one regard to a system and method for selectable funding or adaptable routing of transactions, including electronic and other transactions, which enables a payment initiator such as a consumer, business or government entity to select, schedule, maintain and optimize the timing and technique used to effect various payments, including to schedule bill payments on time and at least cost to the payment enabler or payment initiator.

In one regard, the invention may permit a payment initiator to transparently enjoy the benefits of optimization, once payment schedules and other data are input, since the system arranges for the best available delivery mechanism to satisfy the scheduled payment obligations automatically. The invention may furthermore achieve economies for the bank or other participating institution, since payment sourcing and routing may be optimized at the level of the payment enabler, as well as for the consumer. The invention in another regard may increase the range and flexibility of available funding sources, as well as recipients, using an integrated mediation engine.

BRIEF DESCRIPTION OF THE DRAWINGS

FIG. 3 illustrates a user interface to schedule and manage payment transactions according to an embodiment of the invention.

DETAILED DESCRIPTION OF PREFERRED EMBODIMENTS

Figure 1:
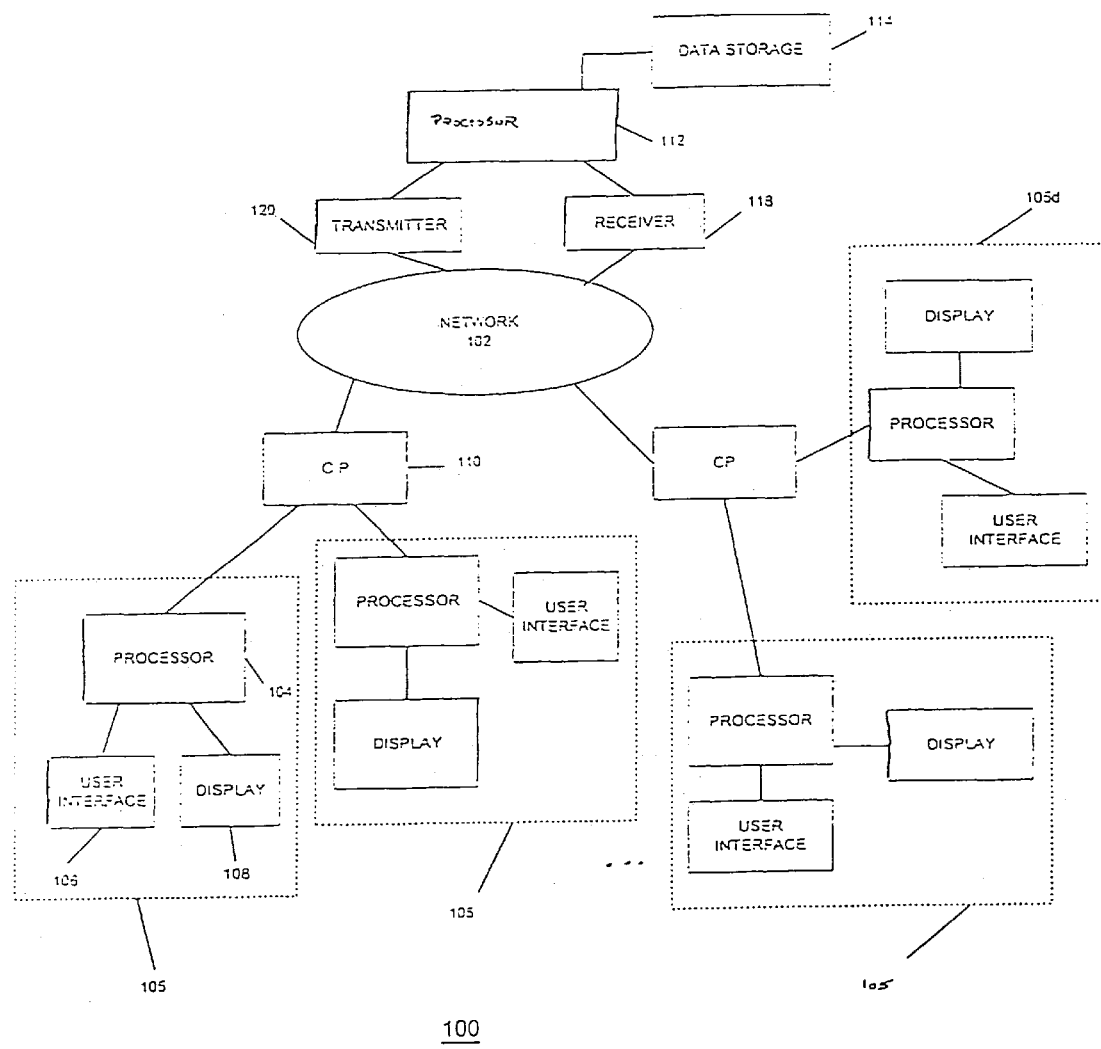
FIG. 1 is a schematic representation of a system for transferring funds according to an embodiment of the invention.

As illustrated in FIG. 1, the payment system 100 of the invention in one regard provide a consumer, business or other payment initiator with an integrated interface with which to manage the programmable payment of a number of types of bill and other payments from diverse sources of funds on an optimized basis.

For instance, using the payment system 100 of the invention the payment initiator may schedule electronic, paper or other payments to, for instance, a mortgage account, a car finance or lease account, credit card or merchant card accounts, utility accounts, contribution accounts such as 401 (k) or educational or charitable accounts, or other accounts or recipients through an integrated and relatively streamlined interface. The invention in another regard may interface to conventional software packages, such as personal finance managers (PFMs) or others as a front end, to increase ease of use for consumers, businesses and other payment initiators familiar with those tools.

The payment initiator may schedule those funds transfers from a variety of source accounts, such as checking or other demand deposit accounts (DDAs), money market funds, securities accounts, stored value accounts, other credit card accounts, currency accounts, overdraft lines of credit, micro payment accounts, lines or credit or other accounts or facilities which may act as a source of funds.

The payment system 100 of the invention in an embodiment provides a flexible, one-view interface to all of the possible sources and recipients of one-time or recurring funds transfers. The payment initiator may therefore view and manage all their transactions without resorting to multiple platforms or performing multiple authentications.

In another regard, the payment system 100 of the invention may automatically drive transactions from source funds to recipient accounts using the most efficient transfer mechanism available for the payment the user has selected. For instance, a payment initiator may select to have a payment made on a credit card account by way of a check or other payment or instrument drawn on a deposit account by a certain day of the month while maintaining funds availability for the longest possible time.

The payment system 100 of the invention may then analyze the costs and delivery timeline for that fund transfer to effectuate the most optimal available transfer. Factors taken into account to optimize the transaction may include the identity of the payee as the funding destination (such as a credit card provider), the delivery timeline (such as the number of days until the payment must be made), the funding source (such as a financial institution providing a direct deposit account), and any third party providers having a relationship with the funding source, including identifying those that offer rewards or other benefits accrue through that channel.

Other optimization factors or rules may include costs to the payment initiator and to the bank or other host entity, contractual or other account minimums, the reliability of the payment channel, dollar amount (e.g. micropayments or macropayments), any discounts for quantity of transactions or amounts of transactions, and other rules-based intelligence. In an embodiment of the invention, the payment system 100 may also aggregate multiple payment transactions to increase efficiency, such as for instance aggregating all of one payment initiator's payments to a single large bank for a month, or the transactions of multiple customers to realize rewards leverage, economies of scale or other benefits.

Other factors accounted for in performing an optimized calculation include the type or category of payee, payment thresholds, tiered rewards or other graduated benefits, the type and nature of any intermediary account used to effect the transaction, and others. Two or more of a payment source, intermediary and a payee for instance may be identified as both belonging to the same association or network, permitting efficiencies to be realized when remaining within the association or network. The factors and rules taken into account may be modified over time to reflect changing market conditions, refinements to the transaction model and other evolving criteria.

As a result, the payment system 100 may determine that the funding destination, such as a revolving credit account provider, is a member of a third party association with which the funding source subscribes or otherwise has access to, such as the commercially available Spectrum service. As a result, the cost of the scheduled payment may be reduced by routing the payment through the common association (such as Spectrum or others) with the payee, rather than routing the transaction through a default payment provider outside the association.

By contrast, the payment system 100 may determine that the payee account and the funding source, or the host entity itself, are part of the same organization. In this instance, an internal transfer may be determined to be the most cost efficient mechanism for effecting payment, without resort to any external payment network. Costs may be reduced for both payment initiator and payment enabler, in that scenario.

In operation, as illustrated in FIG. 1, consumers, businesses, government entities and other payment initiators may use one or more clients 105 to access the payment system 100 through network 102, for instance through multiple connector providers (CPs) 110 such as Internet service providers (ISPs) or others.

According to an embodiment of the invention, the clients 105 may be or include, for instance, a personal computer running Microsoft Windows™ 9x, Millenium™, NT™, 2000 or XP™, Windows™CE™, MacOS™, PalmOS™, Unix, Linux, Solaris™, OS/2™. Clients 105 may also be or include a network-enabled appliance such as a WebTV™ unit, radio-enabled Palm™ Pilot or similar unit, a set-top box, a networkable game-playing console such as Sony Playstation™, Sega Dreamcast™ or Microsoft XBox™, a browser-equipped or other network-enabled cellular telephone, an automated teller machine (ATM), an electronic wallet (client side or server side), or other TCP/IP client or other device, or a stand-alone Website offering. Client 105 may yet further be, include or interface to character recognition platforms or voice recognition platforms or other channels.

Network 102 may be, include or interface to any one or more of, for instance, the Internet, an intranet, a LAN (Local Area Network), a WAN (Wide Area Network) a digital T1, T3, E1 or E3 line, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or other connection. Network 102 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11 (Wi-Fi)-based radio frequency link. Network 102 may yet further be, include or interface to any other wired or wireless, digital or analog interface or connection.

Connection provider 110 may be or include a provider that connects the requesters to the network 102. For example, connection provider 110 may be or include an internet service provider (ISP), a virtual private network (VPN), an intranet, a dial-up access device such as a modem, or other manner of connecting to network 102.

FIG. 1 illustrates four clients 105 connected to network 102 through two connection providers 110, but it will be understood that in practice less or significantly more users may be connected or connectable to payment system 100 than shown in FIG. 1, including through one or more connection providers 110.

The payment system 100 may include a processor 112, which may also have a connection to the network 102. Processor 112 may communicate with one or more data storage modules 114, discussed in more detail below.

Each of clients 105 used by payment initiators to manipulate payments and accounts may contain a processor module 104, a display module 108, and a user interface module 106. Each of clients 105 may have at least one user interface module 106 for interacting and controlling the computer. The user interface module 106 may be, include or interface to one or more of a keyboard, joystick, touchpad, mouse, scanner or similar device or combination of devices. In an embodiment, the display module 108 may be or include a graphical user interface (GUI) to input data and conduct other transaction tasks.

The processor 112 may maintain a connection to the network 102 through transmitter module 118 and receiver module 120. Transmitter module 118 and receiver module 120 may be or include conventional devices which enable processor 112 to interact with network 102. According to an embodiment of the invention, transmitter module 118 and receiver module 120 may be integral with processor 112. The connection to network 102 by processor 112 and clients 105 may be a broadband connection, such as through a T1 or T3 line, a cable connection, a telephone line connection, DSL connection, or other type connection.

Processor 112 functions to communicate with clients 105 and permit clients 105s to interact with each other in connection with transaction services, messaging services and other services which may be provided through payment system 100.

The processor 112 may communicate with a number of data storage modules 114. Each of data storage module 114s may stores various information associated with the payment platform, including administrator data, received instructions, transaction logs or other files or other information. According to an embodiment of the invention, each of data storage module 114s may be located on one or more data storage devices, where the data storage devices are combined or separate from processor 112. Each of data storage modules 114 may be, include or interface to, for example, the Oracle™ relational database sold commercially by Oracle Corp. Other databases, such as Informix™, DB2 (Database 2), Sybase™ or other data storage or query formats, platforms or resources such as OLAP (On Line Analytical Processing), SQL (Standard Query Language), a storage area network (SAN), Microsoft Access™ or others may also be used, incorporated or accessed in the invention. Each of data storage modules 114 may be supported by server or other resources, and may in embodiments include redundancy, such as a redundant array of independent disks (RAID), for data protection.

While a supporting architecture has been described, it will be understood that other architectures could support the operation of payment system 100. In general, the payment system 100 is designed to allow financial and other payment initiators to be able to pay bills and transfer funds when and where they want, in a selectable, integrated and optimized manner.

The payment system 100 of the invention in one regard permits a financial institution or other payment enabler to consolidate and aggregate the movement of money via the Internet, at in-person branch visits, at retail or other kiosks, over the telephone or other network and provide one view to the payment initiator. In an embodiment, a view may also be provided to a call center representative. According to an embodiment of the invention, the payment initiator may be provided with a cumulative total of bills paid and transfers made both in and out for a term defined by the payment initiator (e.g. daily, weekly, monthly, quarterly, annually). Optimizations may be executed on scheduled transactions to minimize cost or maximize float, or manage other variables.

For example, parameters can be established to allow the payment initiator to automatically pay a bill and/or transfer funds without further any involvement based on desired payment date, payment recipient such as a merchant, bank or other account holder, the dollar amount of the transaction, the source of the transaction funds, and other variables. By way of example, a payment initiator may designate that the electricity bill should be paid on the due date for a given month, to avoid a significant late fee by the utility or other entity or a surcharge applied by commercial wire delivery services. Same-day payment may be programmed for other accounts with timing sensitivity, for instance mortgage payments. The payments scheduled according to various tiers of timing may, in embodiments of the invention, be offered to the consumer or other payment initiator at different levels of costs, depending on urgency.

The payment system 100 may also allow the payment initiator to select a prospective time frame in which the payment shall be made. The time frame may be, for example, besides the same day, the next day, next week, specified date, an offset from a bill date (e.g. 2 days before due), or other designated payment windows. The payment system 100 may have an open architecture that supports various interfaces between a server or Web site and host systems such as ACH/NACHA, Wire, RPS, OFX or other protocols.

The ACH network, or automated clearing house, as administered by the NACHA, may for example provide a payment initiator with the ability to transfer funds over the ACH network. Wire transfers, which transfer funds immediately, but at a significantly greater cost than the ACH network, may also be designated by a payment initiator. A remittance process system (RPS) protocol, designed by MasterCard®, or an open financial exchange (OFX) protocol, designed by Intuit, CheckFree, and Microsoft, may also be used to transfer financial information. Other protocols may be employed.

According to an embodiment of the invention, an optimization function may be used by payment system 100 to optimize the transfer mechanisms for transferring funds. By way of example, Thursday, a payment initiator may instruct that her funds be transferred for bill payment by Friday. The payment system 100 may permit that type of short turnaround transaction to take place for instance by, in embodiments, allowing the consumer or other payment initiator to make use of payment mechanisms not generally available to consumers and others for rapid transfers, such as wire transfers or ACH transactions. The payment enabler may assign different service charges to different urgencies of payment.

Figure 2:
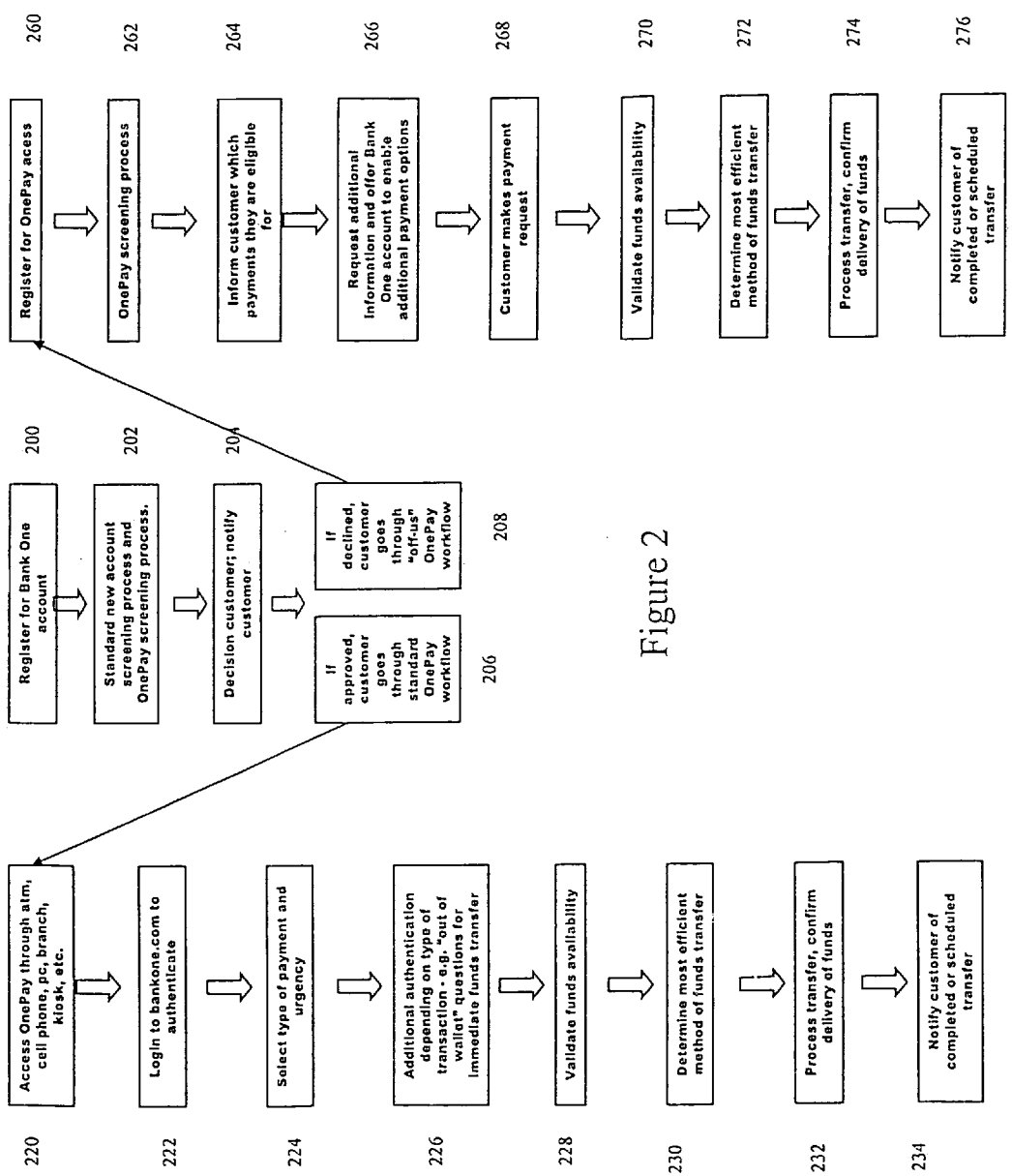
FIG. 2 is a flowchart illustrating funds processing according to an embodiment of the invention.

The payment system 100 may determine what method of transfer will achieve the results requested by the payment initiator, at the lowest cost to the payment enabler or while satisfying other criteria for optimal results. Other methods of optimization may also be used, for instance by utilizing rules based intelligence. Variables included in the optimization model may include, for example, classification of the funding mechanism, payee, dollar amount (for example micro payments, macro payments and others) and other rules such as time of day; lead time, dollar amount, contractual minimums, reliability, pricing, detecting and taking advantage of intra-entity transfers and others. A flowchart of transaction processing according to an embodiment of the invention is illustrated in FIG. 2. In step 200, processing of new customers (not preexisting) begins, at which point the customer, such as a consumer, a qualified business or other payment initiator may register for a new account enabled for payment system 100. Registration may be by in-person registration at a branch or other facility, Web site, telephone, any of the other network techniques illustrated in FIG. 1, or otherwise. In step 202, the customer may undergo a standard screening process, with possible further screening for the integrated payment services of the invention. The customer may sign up for one or more services, such as credit card, DDA, mutual fund, home equity, or others.

After identification, addressing and other information is gathered, at step 204 the host bank or other entity may decide which transfer mechanisms to allow to the customer depending on the customer's request, the risk the entity perceives and what the entity assesses the customer actually needs. If approval is received at step 206, the customer may be directed to an existing customer flow, such as that described below. If approval is declined at step 208, then the customer may be provided with a reduced or modified set of automated features at step 260.

In step 220, an existing customer of a financial institution or other host entity who desires access to payment system 100 may likewise be set up to enjoy an integrated method of accessing payment vehicles instead of having to deal with a differing pipelines of instruments. Using a client 105, the customer may authorize themselves at step 222 to a Web page, VRU, bank teller, CSR or other channel. The customer may then select the type of payment and the urgency, date, cost, rewards allocations or other factors at step 224. For example, a customer may want to pay a corporate credit card bill from a travel bank account. The payment initiator may direct and authorize the payment and choose to have the bill paid the day before the date it is due.

The payment initiator may permit the payment system 100 to optimize the routing and timing of that payment. If the payment initiator chooses to key the payment to a date function to avoid late fees, the payment system 100 may select the best method that will assure that funds are presented on time at the least cost, while also deferring the payment until, for example, 3 days before hand to increase the float or interest on money in a source checking account.

On the other hand, if a payment initiator prefers to program the payment system to pay bills on the day they are received to ensure they are satisfied with time to spare, the payment system 100 may generate instructions for prompt payment at the lowest transaction fee available, benefiting the payment enabler, payment initiator or both.

As a further example, if a payment initiator has procrastinated and is near to a payment due date, they may authorize an immediate and higher cost payment to ensure payment is received by any due date, such as a mortgage or credit card due date. Depending on the my selection of payment type and urgency, in step 226 the payment system 100 may determines whether additional authorization is needed to complete the scheduled transaction. Factors taken into account for approval may include the length of time that a payment initiator has been with the bank or other host entity, the number of accounts or assets maintained by the payment initiator, risk factors such as credit history or NSF history, or others.

At this point, the bank or other host entity as payment enabler may also determine whether the transaction is possible. For instance, a payment initiator may desire to send a payment for a child's college tuition. The payment initiator may want to draw $3000 from a checking account, $4000 from a home equity account, and sell $3000 from a stock brokerage account to satisfy a $10,000 school payment due. However, if the payment initiator eagerly pursues bonus point or other benefits, they may want to use a participating credit card so the points can be used to fly the college student home over a holiday.

At 226, the payment system 100 may permit the payment initiator to register these variables in a stored profile or otherwise to optimize the tuition payment according to date, amount, float, bonus points or other rewards or parameters. The bank or other host entity may determine if the payment initiator has sufficient available funds at step 228, and may suggest different solutions to the payments based on the payment initiator's profile. Once approved, the payment system 100 may determine the most efficient manner for payment in step 230. In step 232, the request for transaction approval may be transparently processed by the payment system 100. While the processing may be transparent to the payment initiator, the payment system 100 may provide a GUI tracking display 136 for customer service representative (CSR) of the bank or other host entity. If there is a question on how the item was processed, the CSR can pull up the transaction and see details in an integrated view. At step 234, the payment system 100 may notify the payment initiator of a completed or scheduled transfer via a Web page message, e-mail notification, on a statement mailed to the payment initiator or other channel.

In the case of a payment initiator seeking a payment transaction who may not be a preexisting customer of the bank or other host entity, in step 260 a person having a separately branded credit card account may wish to pay a bill on that account using a check drawn on a third party bank. The payment initiator may register for access to the payment system 100 with those or other accounts. In step 262, the host entity may authenticate the offered accounts to verify that the accounts actually exist. If they do and the customer is eligible to be set up, the host entity may inform the payment initiator which payment options he or she is eligible for to fulfill their desired transaction.

For instance, the host entity may not allow a non-customer to execute a wire transaction because once the funds are transferred, there is no way to reverse the transaction. At step 266, the host entity may therefore request authentication information to set up the process, as well as optionally offer the customer accounts with the host entity to increase payment capabilities. If the payment initiator elects to open an account with the host entity, processing may proceed to step 206.

Assuming that the payment initiator wants to access the payment system 100 with their existing accounts, the available options may be made to depend on the level of risk the host entity perceives. At step 268, the payment initiator may for instance request a transfer of money from their checking account to pay their credit account. The host entity may validate the funds availability at step 270. At step 272, the payment system 100 may determine the most efficient manner to transfer the funds, but selecting among the reduced set of available payment vehicles. At step 274, the funds may be moved into an intermediary account, or pass directly through to the payee. At step 276, the payment initiator may be notified of the completed payment or scheduled payment via a Web page message, e-mail, monthly statement, page, or other channel. An illustrative interface for use by a consumer, business or other payment initiator is shown in FIG. 3, in which a GUI 302 is displayed. GUI 302 may include pay-from selector box 304 to identify accounts from which to pay bills, a payee selector box 306 to identity the recipient of the payment, a schedule selector box 308 to enter or select desired dates, date ranges or date offsets by which to effectuate payments, and an optimization selector box 310 with which to select one or more variables by which the transaction will be optimized including cost, schedule, rewards and other criteria. Other functions, such as account registration and other functions, may be provided.

Figure 4:
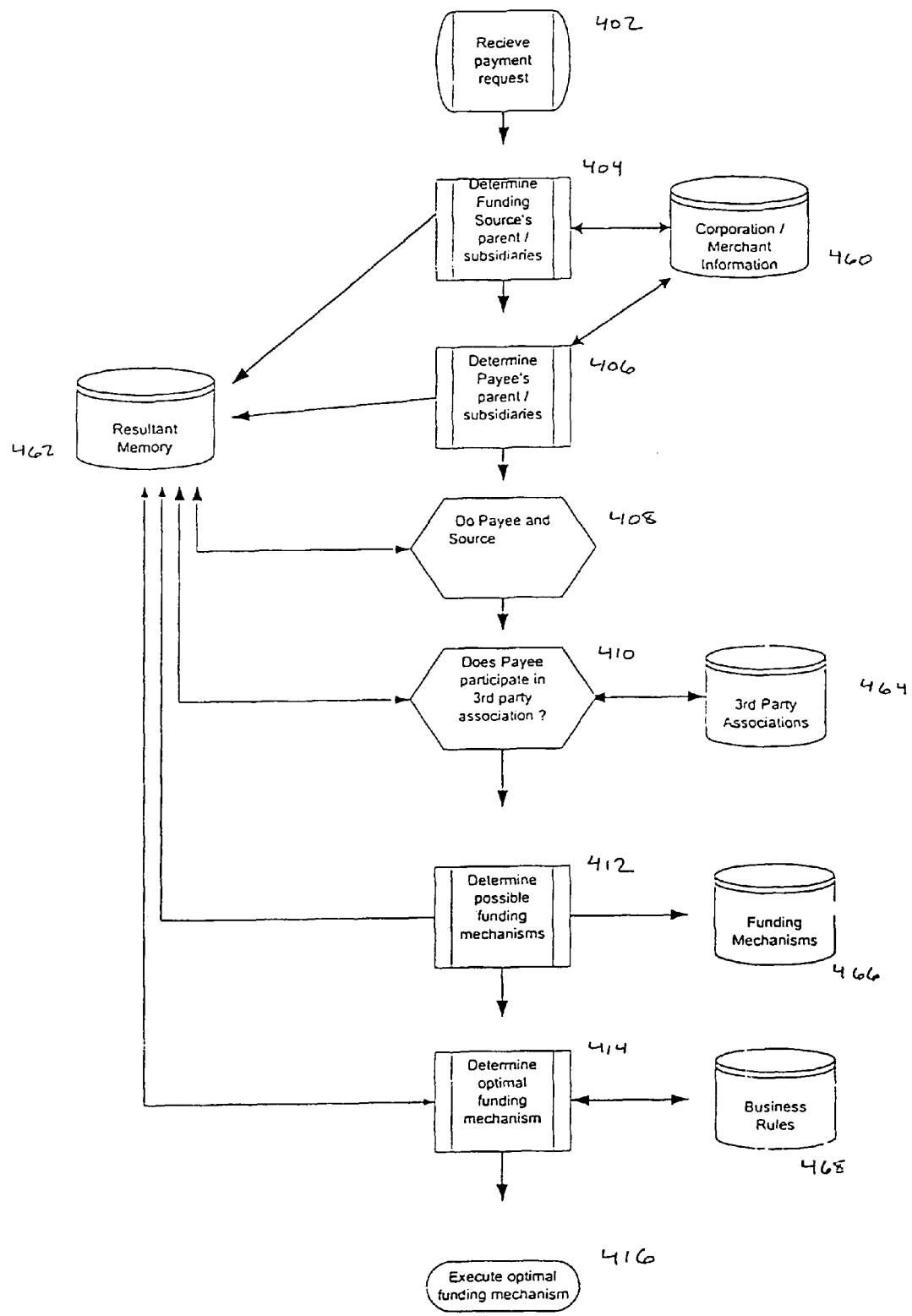
FIG. 4 illustrates optimization processing according to an embodiment of the invention.

An optimization process which may be employed according to an embodiment of the invention is illustrated in FIG. 4. In step 402, a payment request is received. In step 404, a test of the funding source's affiliations may be made, for instance by running a query against a corporate database 460. The corporate database 460 may contain information describing various corporate/merchant hierarchies and interrelationships, for instance indicating that FirstUSA Bank NA is a wholly owned subsidiary of Bank One Corp. Other affiliations are possible.

In step 406, a test may be made of affiliations of the payee of the transaction, for instance by consulting corporate database 460 or other resources. In either of step 404 and 406, information regarding the detected affiliations may be stored to memory 462, such as a relational database, data cache or other resource. In step 408, a test may be made whether the payment source and payee indicate a common affiliation, such as a parent/subsidiary or other relationship.

In step 410, a test may be made whether the payee participates in a third party association that may have an effect on the transaction. This may be done by running a query against an association database 464 or other resource, for instance storing all participants in an electronic transaction network such as Spectrum™, ACH or others. In step 412, a set of possible funding mechanisms to fulfill the transaction may be generated, for instance indicated all transfer types that will fulfill minimal scheduling requirements. This may be done by running a query on funding mechanism database 466, which may include descriptive fields such as cost, eligibility criteria, time frame, risk level, security, reliability rating and others.

In step 414 an optimal finding mechanism under all the parameters of the transaction may be generated. In so doing, a business rules database 468 may be consulted, to determine whether factors such as contractual minimums, volume discounts, micro payments or other special funds processing, tiered thresholds or other rules or intelligence may be stored. The business rules may be modified over time to reflect updated market conditions or refinements to the processing model. In step 416, the optimal transaction may be executed. In various other of the steps, data may be stored to memory 462 as appropriate.

The foregoing description of the system and method of the invention is illustrative, and variations in configuration and implementation will occur to persons skilled in the art. For instance, while the invention has generally been described in terms of a processor 116 managing the scheduling and optimization of transactions over a network 102, in embodiments the processor 116 or other intelligent device may be self-contained, for instance in a desktop machine, for instance running a so-called fat client.

In other embodiments, the input interface to the payment initiator may be by way of a telephone connection, for instance via a call center facility or a voice response unit (VRU) enabled to communicate with data storage 114 or other elements. Yet further, while the invention has generally been described in terms of scheduled transactions in which the presented bill, payment source and payee all deal in the same currency, in embodiments currency conversions may be performed at appropriate stages of the transaction. Yet further, while the invention has generally been described in terms of electronic fulfillment of scheduled bills, check or other hard copy or other types of payment may be optimized and delivered according to the invention. The scope of the invention is accordingly intended to be limited only by the following claims.

The invention claimed is:

1. A system for managing a transmission of funds, based on a request for the transmission of funds, the system comprising:

a first input interface for communicating first information to a processor, the first information identifying at least one of a payment source and a payee account;

a second input interface for communicating second information to the processor, the second information containing affiliation information; and the processor communicating with the first input interface and the second input interface so as to receive the first information and the second information;

the processor performing an affiliation test, using the affiliation information, to determine affiliates of the payment source and to determine affiliations of a payee, the payee being associated with the payee account;

the processor, based on the affiliation test, determining from a set of payment mechanisms a reduced set of payment mechanisms, the reduced set being a set of possible payment mechanisms that could effect the transmission of funds;

the processor performing an optimization determination so as to determine a selected payment mechanism, out of the reduced set of payment mechanisms, to use to transfer the funds from the payment source to the payee account, the selected payment mechanism being the optimal payment mechanism based on considered parameters, the considered parameters including the first information and the affiliates of the payment source determined by the affiliation test;

the processor performing the transmission of funds using the selected payment mechanism.

2. The system of claim 1, in which the affiliation test, which is performed by the processor, includes determining a common affiliate of the payee and the payment source.

3. The system of claim 1, in which the affiliation test, which is performed by the processor, includes determining a common affiliate of the payment source and the payee account.

4. The system of claim 1, the considered parameters include at least one of fulfilling a transaction schedule and minimizing a payment penalty.

5. The system of claim 1, the considered parameters include fulfilling a contractual obligation.

6. The system of claim 1, the considered parameters include maximizing volume discounts.

7. The system of claim 1, the considered parameters include aggregating transaction amounts.

8. The system of claim 1, the optimization comprises minimizing a cost variable, and the cost variable comprises at least one of a transaction cost charged to a payment initiator and an internal cost absorbed by a payment enabler.

9. The system of claim 1, in which the payment source includes at least one of a direct deposit account, a source credit account, a mortgage account, a securities account, a money market account, a micro payment account, an overdraft account and a stored value account; and
    the payee account includes at least one of a utility account, a mortgage account, a payee credit account, and a contribution account.

10. The system of claim 1, the first input interface receives first information from a desktop graphical user interface.

11. The system of claim 1, the at least one payment source comprises at least one selected from the group consisting of a checking or other demand deposit account (DDA), money market fund, securities account, stored value account, credit card account, currency account, overdraft line of credit, micro payment account, and line of credit.

12. The system of claim 1, the processor further performing a second optimization determination, the second optimization determination selecting the payment source, from a plurality of payment sources.

13. The system of claim 1, the system allows the payment request initiator to select a payment source from a plurality of payment sources.

14. The system of claim 1, the processor aggregating the transaction with other transactions so as to realize economies of scale, the economies of scale being considered in the optimization determination.

15. The system of claim 1, where the payment source includes multiple payment sources.

16. A system for managing a transmission of funds, based on a request for the transmission of funds, the system comprising:
    a first input interface for communicating first information to a processor, the first information identifying at least one of a payment source and a payee account;
    a second input interface for communicating second information to the processor, the second information containing affiliation information; and
    the processor communicating with the first input interface and the second input interface so as to receive the first information and the second information;
    the processor performing an affiliation test, using the affiliation information, to determine affiliates of the payee account and the payment source;
    the processor, based on the affiliation test, determining from a set of payment mechanisms a reduced set of payment mechanisms, the reduced set being a set of possible payment mechanisms that could effect the transmission of funds;
    the processor performing an optimization determination so as to determine a selected payment mechanism, out of the reduced set of payment mechanisms, to use to transfer the funds from the payment source to the payee account, the selected payment mechanism being the optimal payment mechanism based on considered parameters, the considered parameters including the first information and the affiliates of the payee account determined by the affiliation test;
    the processor performing the transmission of funds using the selected payment mechanism.

17. A method for managing a transmission of funds using a processor, in conjunction with a request for the transmission of funds, the method comprising:
    communicating first information to the processor, the first information identifying at least one of a payment source and a payee account;
    communicating second information to the processor, the second information containing affiliation information; and
    receiving, by the processor, the first information and the second information;
    performing an affiliation test, by the processor, using the affiliation information, to determine affiliates of the payment source and to determine affiliations of a payee, the payee being associated with the payee account;
    based on the affiliation test, the processor determining from a set of payment mechanisms a reduced set of payment mechanisms, the reduced set being a set of possible payment mechanisms that could effect the transmission of funds;
    performing an optimization determination, by the processor, so as to determine a selected payment mechanism, out of the reduced set of payment mechanisms, to use to transfer the funds from the payment source to the payee account, the selected payment mechanism being the optimal payment mechanism based on considered parameters, the considered parameters including the first information and the affiliates of the payment source determined by the affiliation test;
    performing the transmission of funds, by the processor, using the selected payment mechanism.

\* \* \* \* \*

UNITED STATES PATENT AND TRADEMARK OFFICE
CERTIFICATE OF CORRECTION

PATENT NO. : 7,801,814 B2  
APPLICATION NO. : 11/517268  
DATED : September 21, 2010  
INVENTOR(S) : Cataline et al.

Page 1 of 1

It is certified that error appears in the above-identified patent and that said Letters Patent is hereby corrected as shown below:

On the Title page, Item (30) should read,

This application is a CON of 09/985,900 11/06/2001 which claims benefit of 60/245,665 11/06/2000

Signed and Sealed this
Twenty-third Day of August, 2011

David J. Kappos
*Director of the United States Patent and Trademark Office*